(12) United States Patent
Shono

(10) Patent No.: US 8,678,484 B2
(45) Date of Patent: Mar. 25, 2014

(54) UPPER VEHICLE BODY STRUCTURE OF AUTOMOBILE

(75) Inventor: Hidekazu Shono, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 13/392,255

(22) PCT Filed: Jun. 29, 2010

(86) PCT No.: PCT/JP2010/061035
§ 371 (c)(1),
(2), (4) Date: Feb. 24, 2012

(87) PCT Pub. No.: WO2011/024552
PCT Pub. Date: Mar. 3, 2011

(65) Prior Publication Data
US 2012/0153676 A1    Jun. 21, 2012

(30) Foreign Application Priority Data

Aug. 26, 2009 (JP) ................................. 2009-195537

(51) Int. Cl.
*B62D 25/04* (2006.01)
*B62D 27/02* (2006.01)

(52) U.S. Cl.
USPC .................... 296/203.03; 296/193.06; 296/29

(58) Field of Classification Search
USPC ............. 296/29, 30, 187.12, 187.13, 193.02, 296/193.05, 193.06, 203.03
See application file for complete search history.

(56) References Cited

U.S. PATENT DOCUMENTS

| | | | |
|---|---|---|---|
| 5,325,585 A | 7/1994 | Sasaki et al. | |
| 5,873,618 A | 2/1999 | Ejima | |
| 7,407,222 B2 * | 8/2008 | Anderson et al. | 296/193.06 |
| 2006/0055209 A1 | 3/2006 | Hoshino | |

FOREIGN PATENT DOCUMENTS

| | | |
|---|---|---|
| GB | 2303589 | 2/1997 |
| JP | 05-085181 | 4/1993 |
| JP | 09-076937 | 3/1997 |
| JP | 10-167114 | 6/1998 |
| JP | 10-278841 | 10/1998 |
| JP | 11-059489 | 3/1999 |
| JP | 2005-313734 | 11/2005 |
| JP | 3796777 | 4/2006 |
| JP | 2007-030716 | 2/2007 |
| JP | 2008-247189 | 10/2008 |

* cited by examiner

*Primary Examiner* — Glenn Dayoan
*Assistant Examiner* — Jason S Daniels
(74) *Attorney, Agent, or Firm* — Rankin, Hill & Clark LLP

(57) ABSTRACT

Disclosed is an upper vehicle body structure (20) having a groove (31) between an outside panel (28) and a roof panel (24). The upper end of a center pillar stiffener (34) overlaps with a roof side stiffener (41). The roof side stiffener (41) is joined to a roof arch (23) at the groove (31). The upper end of a center pillar reinforcing member (33) inside the center pillar stiffener (34) is joined to an end (25*b*) of a corner gusset (25) at a position below the grooves (31), the other end (25*a*) of the corner gusset being connected to the roof arch (23). With this, concentration of impact load to the corner gusset (25) can be avoided.

5 Claims, 10 Drawing Sheets

UPPER VEHICLE BODY STRUCTURE OF AUTOMOBILE

TECHNICAL FIELD

The present invention relates to an upper part structure of a vehicle body where a center pillar and a roof side pillar meet, which structure is imparted with improved rigidity and strength against a load generated by a side collision (lateral thrust).

BACKGROUND ART

Vehicle body upper part structures in which a reinforcing member is provided to a portion connecting a center pillar and a roof side rail are generally known. This type of vehicle body upper part structure is appropriately designed to be capable of ensuring a designated body rigidity and strength against a side impact load. A structure in which a corner gusset is provided between a center pillar inner member and a roof reinforcement (roof side stiffener) is known as such an vehicle body upper part structure (see Patent Literature 1, for example).

The vehicle body upper part structure of Patent Literature 1 includes: a center pillar comprised of a center pillar inner member and a center pillar outer member; a side frame outer member that covers the center pillar inner member and the center pillar outer member; a roof side rail to which an upper part of the center pillar inner member is joined; a roof reinforcement and a roof panel joined to upper ends of the roof side rail, the center pillar inner member, the center pillar outer member, and the side frame outer member; and a roof corner gusset that spans the roof reinforcement and the roof side rail.

However, in the vehicle body upper part structure of Patent Literature 1, a side impact load is born only by the center pillar inner member (center pillar reinforcing member), and the side load impact is therefore concentrated in the corner gusset (roof corner gusset). The corner gusset must therefore be imparted with increased strength and rigidity. Accordingly, the corner gusset must be increased in size, creating a problem in that a space in the passenger compartment is reduced.

PRIOR ART LITERATURE

Patent Literature:
Patent Literature 1: Japanese Patent No. 3796777

SUMMARY OF INVENTION

Technical Problem

An object of the present invention is to provide a vehicle body upper part structure in which a side impact load can be prevented from concentrating in the corner gusset, a collapse of the cross-section at the base part of the center pillar can be suppressed, and a wide space in the passenger compartment can be ensured.

Solution to Problem

According to a first aspect of the present invention, there is provided a vehicle body upper part structure having a groove defined to extend between an outside panel and a roof panel in a lengthwise direction of a vehicle body, which structure comprises: a center pillar stiffener covered by the outside panel and extending in a vertical direction of the vehicle body; a roof side stiffener extending in the lengthwise direction of the vehicle body and overlapped by an upper end of the center pillar stiffener; a roof arch to which the roof side stiffener is joined at the groove; a center pillar reinforcing member disposed closer to a lateral center of the vehicle body than the center pillar stiffener; and a corner gusset having one end connected to the roof arch and an opposite end joined to an upper end of the center pillar reinforcing member below the groove, with the roof side rail interposed therebetween.

It is preferred that the roof arch comprise a roof arch body having a bottom part and an upwardly opening, hat-shaped cross-section, and a reinforcing member having a hat-shaped cross-section opening downwardly toward the bottom part, and that the roof arch body and the reinforcing member jointly define a closed cross-section that is continuous in a widthwise direction of the vehicle body.

Preferably, the corner gusset comprises a curved sheet having beads formed along a width of the vehicle body.

The corner gusset is preferably fixed along the roof side rail which is comprised of one of a pair of L-shaped members and a single U-shaped member.

It is preferred that the roof side stiffener have an opening formed to allow an upper end of the center pillar reinforcing member to pass thereunder and come into contact with the roof side rail, and that the upper end of the center pillar reinforcing member be fastened by bolts to the roof side rail together with the opposite end of the corner gusset.

It is preferred that the center pillar stiffener have an upper-end joint formed at an upper end thereof so as to extend along an upper surface and a side surface of the roof side stiffener, and the upper-end joint have a width in the lengthwise direction of the vehicle body, which is greater than a width of the roof arch in the lengthwise direction of the vehicle body.

Preferably, the roof arch body has a tongue piece coupled to the roof side stiffener unitarilly with a bottom wall of the groove.

It is preferred that the corner gusset have a projection formed between left and right beads at an upper part thereof, and the projection be joined to the roof arch at the closed cross-section.

It is preferred that the left and right beads merge together into one at a lower part of the corner gusset to form right and left flat parts at the lower part, and the flat parts be joined to an upper end of the center pillar reinforcing member.

Advantageous Effects of Invention

In the present invention, the upper end of the center pillar stiffener is made to overlap with the roof side stiffener, the roof side stiffener is joined to the roof arch by the groove, and the upper end of the center pillar reinforcing member disposed to the inside of the center pillar stiffener is joined below the groove to the other end of the corner gusset, the corner gusset being connected by one end to the roof arch. A side impact load on the center pillar is therefore divided into two paths: a path for transmitting the load from the center pillar stiffener toward the roof arch via the roof side stiffener, and a path for transmitting the load from the center pillar reinforcing member toward the roof arch via the corner gusset. Accordingly, the roof side cross-section can be made compact and the space in the passenger compartment can be expanded by reducing load-sharing in the roof side cross-section that includes the roof side stiffener. In addition, dividing the side impact load on the center pillar into two paths allows the cross-section at the base part of the upper part of the center pillar to be minimized, the plate thickness of the portion containing the center pillar to be optimized, and a collapse of the cross-section at the base part of the center pillar to be suppressed.

The roof arch includes the roof arch body and the reinforcing member, and forms a closed cross-section that is continuous in the vehicle widthwise direction. The roof side stiffener can therefore be made stronger at the continuous closed cross-section even without the strengthening of the joint between the roof arch and the roof side stiffener at the groove. As a result, the weight of the vehicle body can be reduced.

The corner gusset does not protrude into the passenger compartment because the gusset has beads formed in the vehicle widthwise direction and is a curved plate. As a result, the passenger compartment can be expanded.

The corner gusset is fixed along a roof side rail constructed of a pair of L-shaped members or along a roof side rail constructed of a single U-shaped member, allowing the roof side rail to be supported over a wide area. The rigidity of the vehicle body can thereby be improved.

DESCRIPTION OF EMBODIMENTS

Certain preferred embodiments of the present invention will be described below with reference to the attached drawings.

Embodiments

Figure 1:
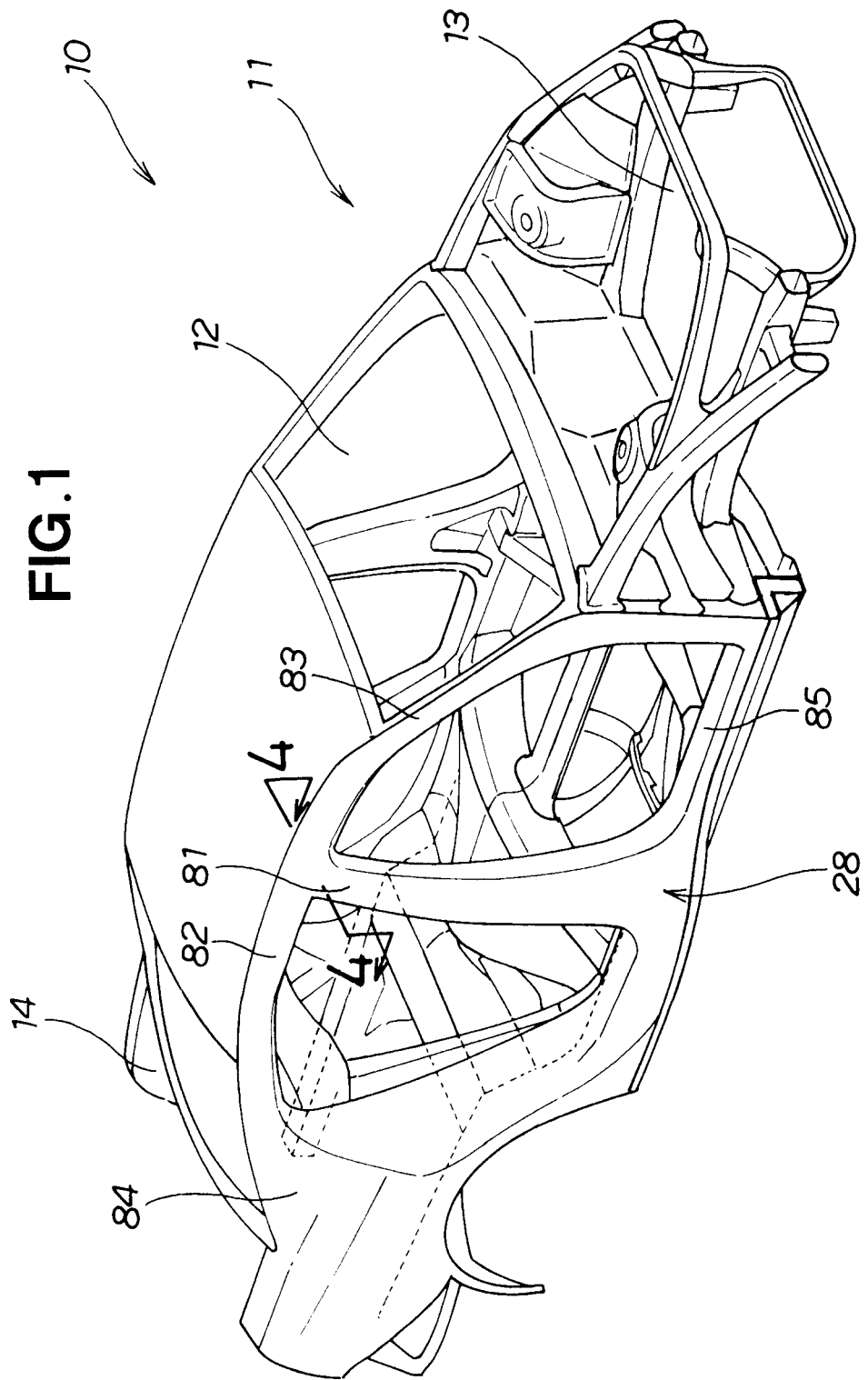
FIG. 1 is a perspective view illustrating a vehicle employing a vehicle body upper part structure according to the present invention.

A vehicle 10 includes a vehicle body 11, as shown in FIG. 1. The vehicle body 11 has three box sections, namely, a passenger compartment 12, an engine compartment 13, and a trunk compartment 14.

Figure 2:
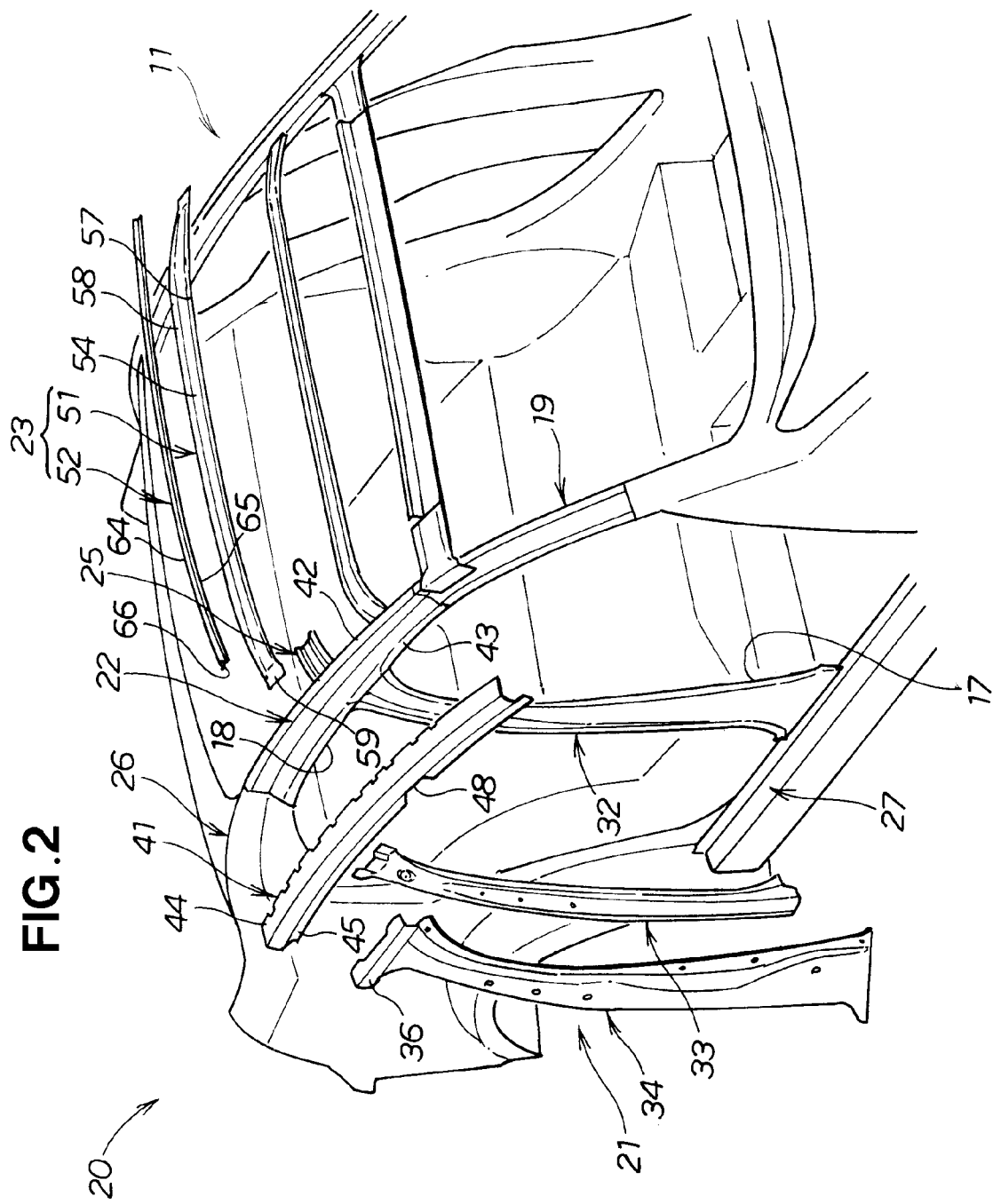
FIG. 2 is an exploded perspective view showing the vehicle body upper part structure of FIG. 1.

A roof side rail 22 and a side sill 27 extend above and below relative to a horizontal direction, as shown in FIG. 2. A front pillar 19, a center pillar inner member 32, and a rear pillar 26 are provided in a vertical direction in order from the front. A front door opening 17 is formed by the roof side rail 22, the side sill 27, the front pillar 19, and the center pillar inner member 32. A rear door opening 18 is formed by the roof side rail 22, the side sill 27, the center pillar inner member 32, and the rear pillar 26.

As shown in FIGS. 2 to 5, a vehicle body upper part structure 20 is constructed of a center pillar 21 extending in the height direction of the vehicle body on a side of the vehicle body; a roof side rail 22 linked to the upper end of the center pillar 21 and extended in the lengthwise direction of the vehicle body; a roof arch 23 extending in the widthwise direction of the vehicle body from the roof side rail 22 at the position of the center pillar 21 relative to the lengthwise direction of the vehicle body; a roof panel 24 (FIG. 4) extending in the widthwise direction of the vehicle body from the roof side rail 22 above the roof arch 23; a corner gusset (roof bracket or roof arch gusset) 25 in which one end 25a is linked to the roof arch 23 and the other end 25b is linked to the roof side rail 22 and the center pillar 21, which are structural members; an outside panel 28 for covering the center pillar 21, the roof side rail 22, the front pillar 19, the rear pillar 26, and the side sill 27; and an upwardly opening U-shaped groove 31 formed between the outside panel 28 and the roof panel 24.

The center pillar 21 is constructed as a hollow cylindrical frame having a closed cross-section. Specifically, the center pillar 21 includes the center pillar inner member 32, the upper end thereof being joined to the roof side rail 22 and the lower end thereof being joined to the side sill 27; a center pillar reinforcing member 33, the upper end thereof being joined to the roof side rail 22 and the other end 25b of the corner gusset 25 above the center pillar inner member 32, and the lower end thereof being joined to a center pillar stiffener 34; the center pillar stiffener 34, the upper end thereof being joined to a roof side stiffener 41 and the lower end thereof being joined to the side sill 27; and a center pillar part 81 of the outside panel 28 for covering the center pillar stiffener 34, the center pillar reinforcing member 33, and the center pillar inner member 32 from the outside of the passenger compartment.

Figure 5:
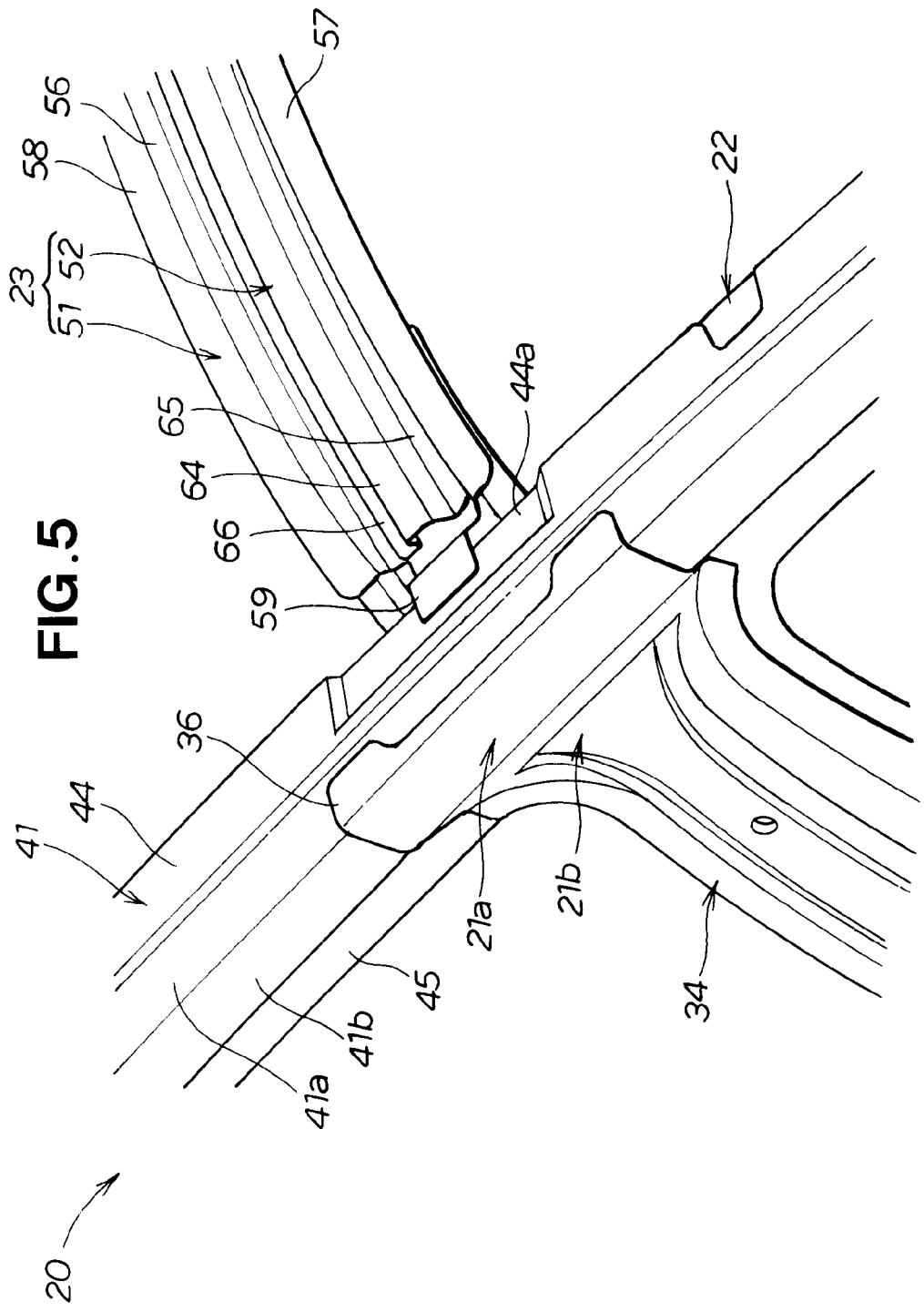
FIG. 5 is a perspective view illustrating a roof arch, a center pillar stiffener, and a roof side stiffener of FIG. 2 being joined together.

The center pillar stiffener 34 is provided to the outside, in terms of the vehicle widthwise direction, of the center pillar reinforcing member 33, as shown in FIG. 5. The upper end of the center pillar stiffener 34 is welded to an upper surface 41a and a side surface 41b of the roof side stiffener 41. An upper-end joint 36 having a shape that conforms to the shape of the cross-section of the upper surface 41a and the side surface 41b of the roof side stiffener 41 is formed in the upper end of the center pillar stiffener 34. The upper-end joint 36 is formed having wide dimensions in the lengthwise direction of the vehicle body.

Figure 4:
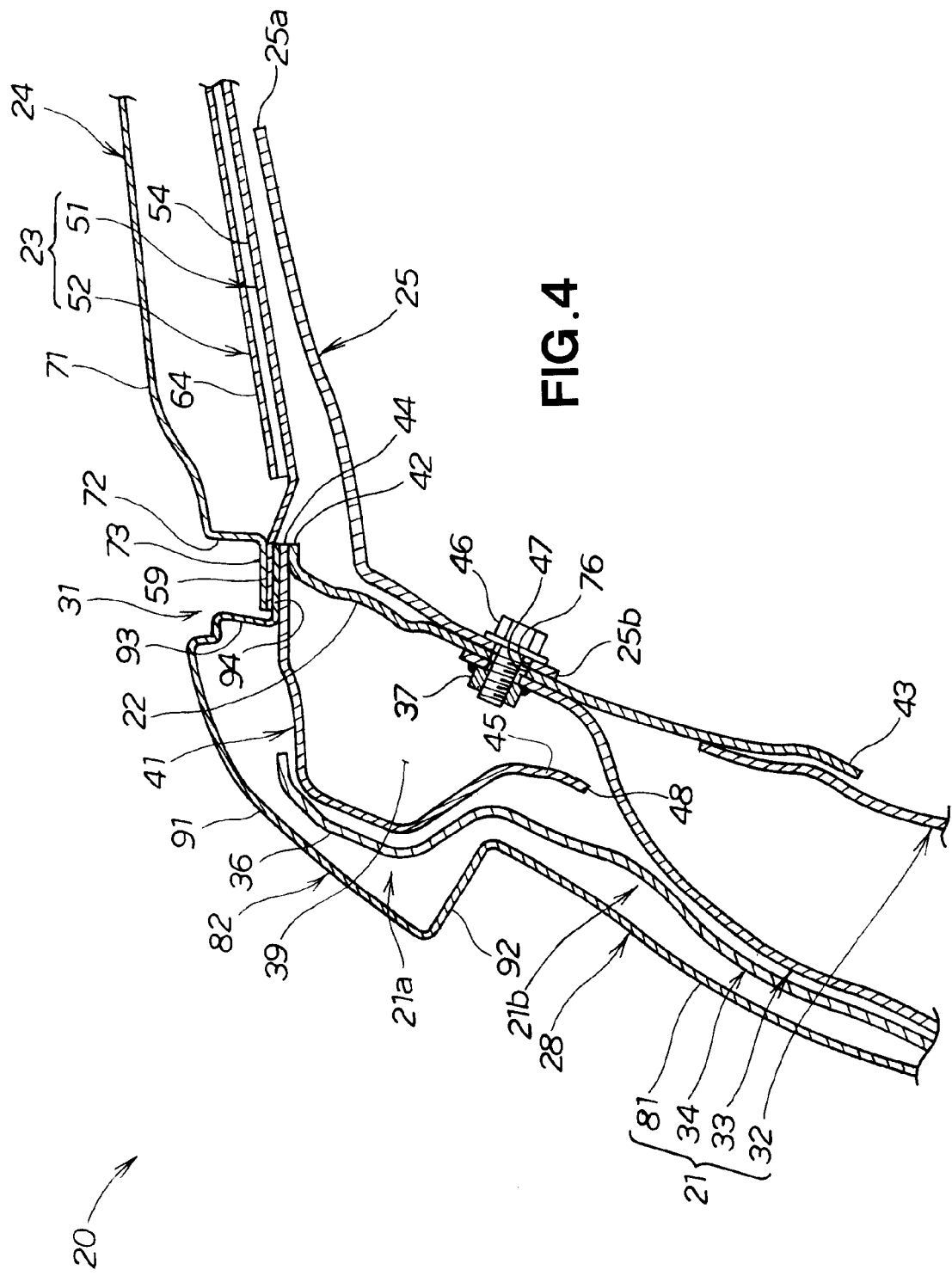
FIG. 4 is an enlarged cross-sectional view taken along line 4-4 of FIG. 1.

The upper end of the center pillar reinforcing member 33 is provided with a plurality of weld nuts 37 for fastening the other end 25b of the corner gusset 25 by a plurality of bolts 46, with the roof side rail 22 interposed therebetween, as shown in FIG. 4. Specifically, the upper end of the center pillar reinforcing member 33 is elongated to reach the roof side rail 22 and fastened to the corner gusset 25 on the interior of the compartment.

Figure 6:
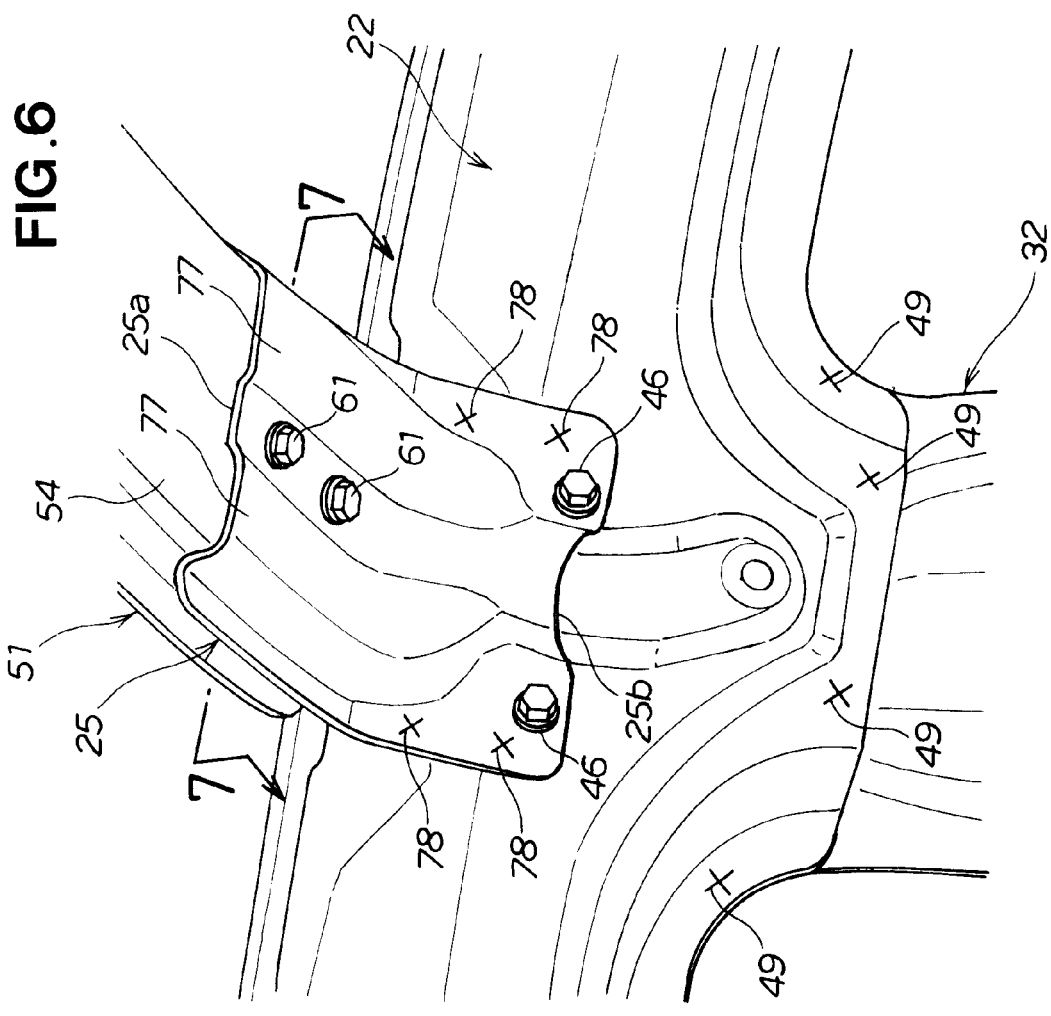
FIG. 6 is a perspective view showing the corner gusset of FIG. 4 being in an attached state.

The roof side rail 22 is an L-shaped member extending in the lengthwise direction of the vehicle body. The roof side rail 22 is provided with the roof side stiffener 41 having a U-shaped cross-section for increasing the strength of the roof side rail 22. Specifically, the roof side rail 22 is constructed of the L-shaped member and the U-shaped member. The roof side rail 22 is welded to the upper end of the center pillar inner member 32 at a plurality of weld sites 49, as shown in FIG. 6.

Upper flanges 42, 44 and lower flanges 43, 45 are formed above and below the roof side rail 22 and the roof side stiffener 41, respectively, and the upper flanges 42, 44 and the lower flanges 43, 45 are welded together to construct a frame having a hollow cross-section. Steps 42a, 44a for mounting a tongue piece 59 of the roof arch 23 via a rail flange part 94

Figure 3:
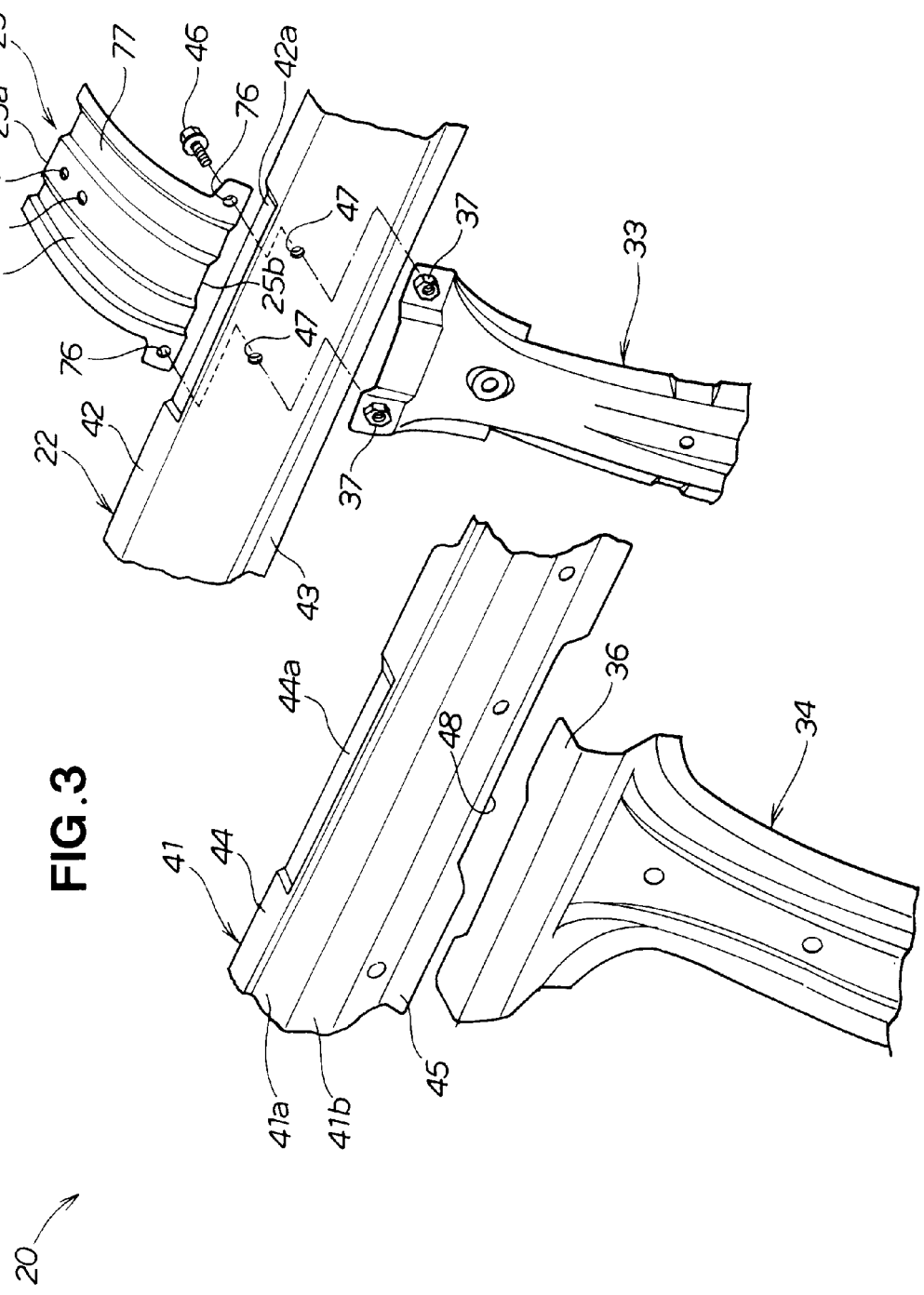
FIG. 3 is an exploded perspective view illustrating center pillar structural members, a roof side rail, and a corner gusset of FIG. 2.

(FIG. 4) of the outside panel 28 (FIG. 4) are provided to a portion in which the roof arch 23 and the upper flanges 42, 44 of the roof side rail 22 and the roof side stiffener 41 are welded and fixed to each other, as shown in FIGS. 3 to 5.

The roof side rail 22 is covered by a roof side rail part 82 of the outside panel 28 from the outside of the passenger compartment together with the roof side stiffener 41. Through-holes 47 for accommodating the bolts 46 are formed in the roof side rail 22.

The roof side stiffener 41 has an opening 48 formed in order to attach the upper end of the center pillar reinforcing member 33 to the roof side rail 22. The upper end of the center pillar reinforcing member 33 is passed through the opening 48 in the roof side stiffener 41 from the outside to the inside in the vehicle widthwise direction, is brought into contact with the roof side rail 22, and is fastened to the roof side rail 22 by the bolts 46, 46 together with the other end 25b of the corner gusset 25.

The roof arch 23 includes a roof arch body (roof arch lower) 51 joined to the roof side rail 22, and a reinforcing member (roof arch upper) 52 overlapping the roof arch body 51 from above and reinforcing the roof arch body 51, as shown in FIGS. 5 to 8. A rail having a continuous closed cross-section (FIG. 7) extending in the vehicle widthwise direction is formed by the roof arch body 51 and the reinforcing member 52.

Figure 7:
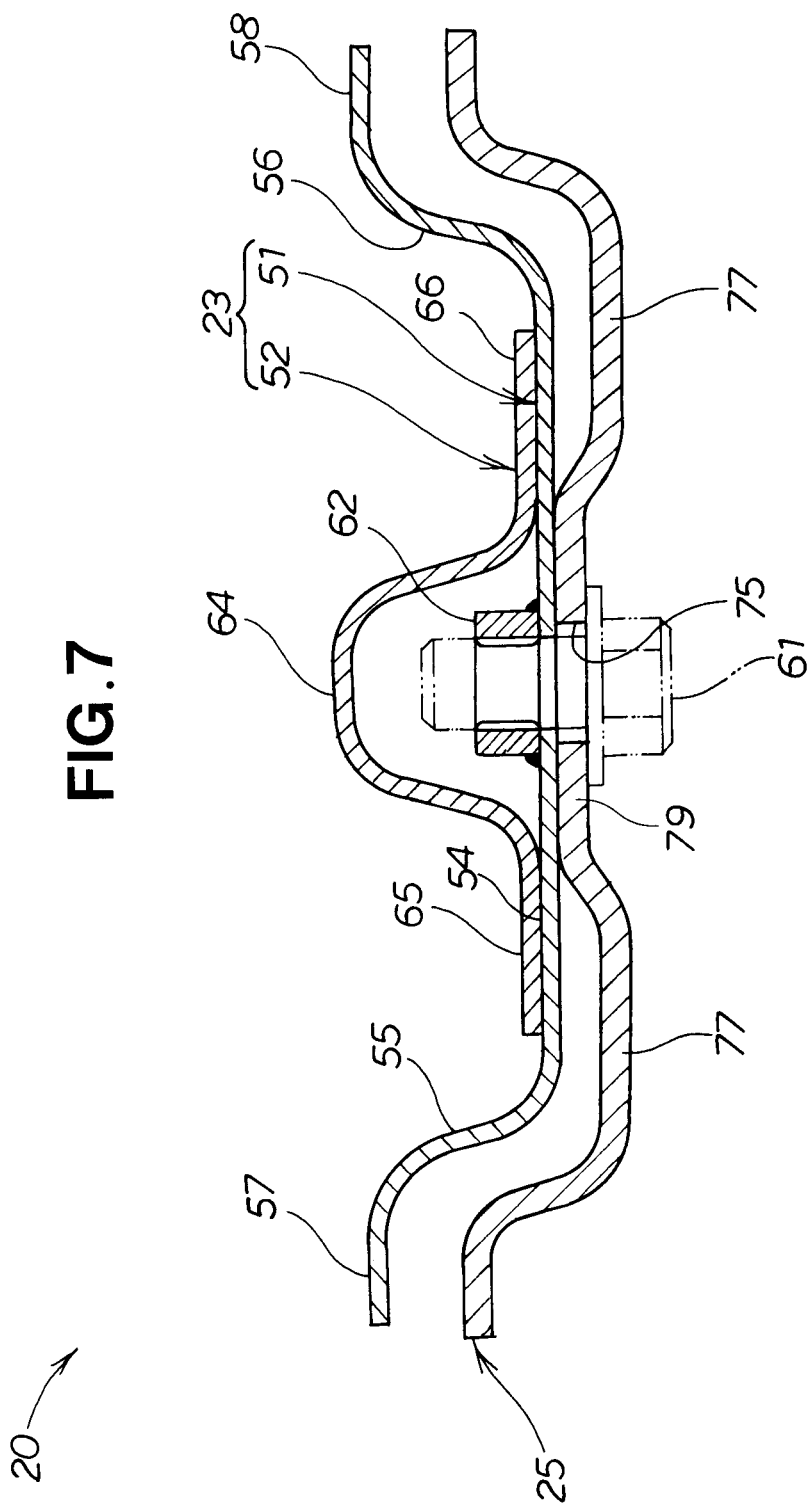
FIG. 7 is an enlarged cross-sectional view taken along line 7-7 of FIG. 6.
Figure 8:
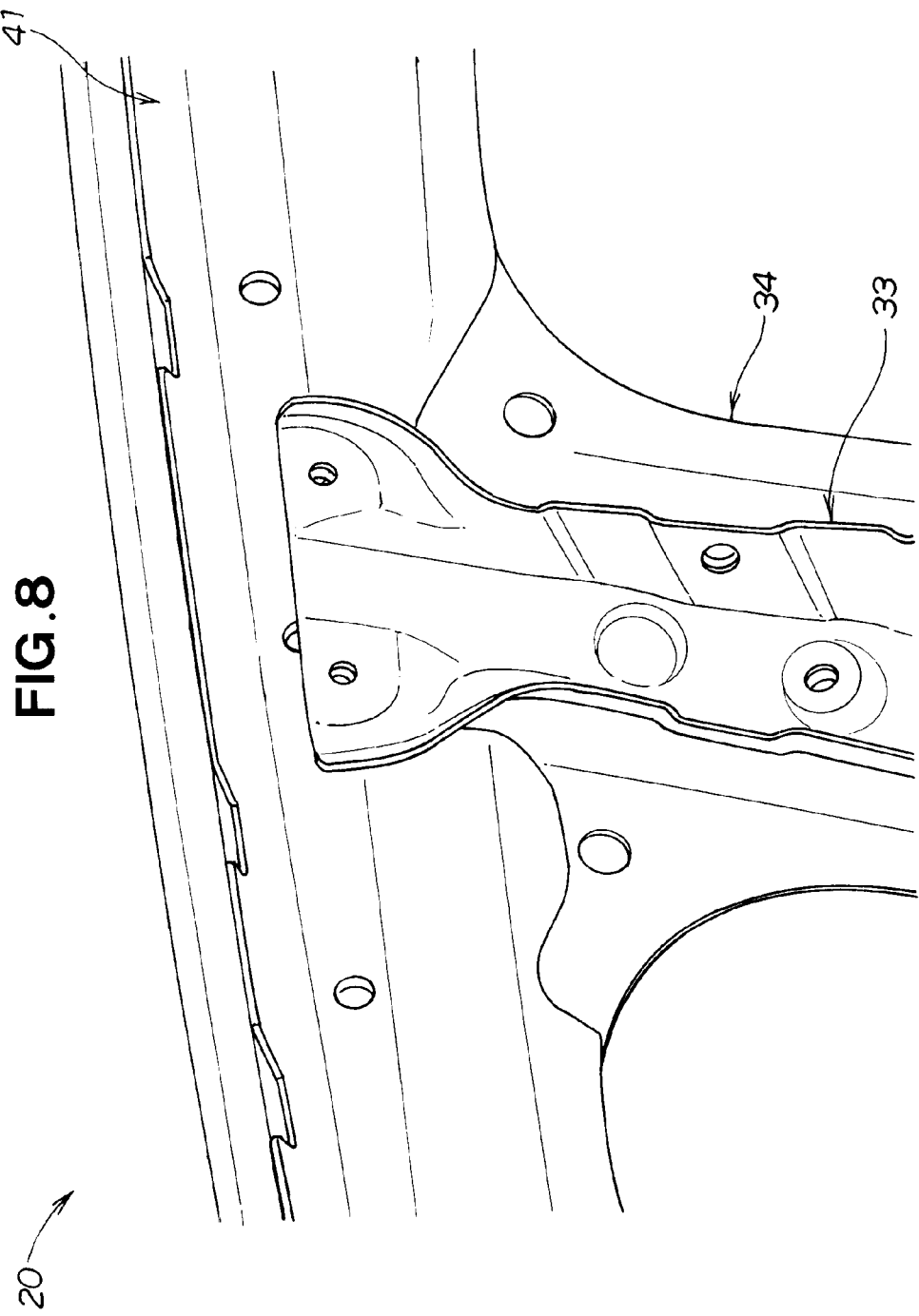
FIG. 8 is a perspective view showing a relationship between a center pillar reinforcing member and the roof side stiffener of FIG. 4.

The roof arch body 51 includes a bottom part 54 to which the one end 25a of the corner gusset 25 is joined, a front wall 55 and a rear wall 56 protruding upward from the bottom part 54, a front flange 57 and a rear flange 58 protruding in the lengthwise direction from the front wall 55 and the back wall 56, respectively, and a tongue piece 59 (FIG. 5) coupled (welded and fixed) to the roof side stiffener 41, as shown in FIG. 7. Specifically, the roof arch body 51 is a member formed as an upwardly turned hat in lateral cross-section. Weld nuts 62, 62 (only one nut 62 is shown in FIG. 7) to which the one end 25a (FIG. 6) of the corner gusset 25 is fastened by the bolts 61, 61 are welded to the bottom part 54.

The roof arch upper 52 includes a downwardly opening rail part 64, and a front flange part 65 and a rear flange part 66 formed on the front and rear of the rail part 64 and coupled to the bottom part 54 of the roof arch body 51. Specifically, the roof arch upper 52 is a member having a downwardly opening cross-sectional hat shape (reverse cross-sectional hat), and is used to reinforce the bottom part 54 of the roof arch body 51 by the reverse cross-sectional hat.

The roof arch 23 is prevented from bending sharply because the roof arch body 51 has a cross-sectional hat shape and the roof arch upper 52 has a reverse cross-sectional hat shape. Deformation at a base part (upper part) 21a and a main body part 21b of the center pillar 21 is thereby reduced. Specifically, deformation during side impact is reduced, and deflection at the chest portion can be reduced by ensuring distance between a passenger and the center pillar 21 when the passenger is restrained by a seatbelt device.

The tongue piece 59 on the roof arch 23 is mounted on the step 44a of the upper flange 44 of the roof side stiffener 41 via the outside panel 28 (FIG. 4), an end flange 73 of the roof panel 24 is then mounted as shown in FIG. 4, and the tongue piece 59 and the end flange 73 are fixed on the step 44a of the upper flange 44 of the roof side stiffener 41.

The roof panel 24 has a panel body 71 for covering the upper part of the vehicle body 11, a bent part 72 bent downward in the vehicle widthwise direction of the panel body 71, and the end flange 73 formed facing the outside from the bent part 72 in the vehicle widthwise direction, as shown in FIG. 4.

The contour of the U-shaped groove (Mohican groove) 31 is constructed by the bent part 72, the end flange 73, and the outside panel 28.

The vehicle body upper part structure 20 is obtained by superposing the roof panel 24, the roof arch 23, and the outside panel 28 in this order from the top, and is welded and fixed to the roof side stiffener 41 and the roof side rail 22.

Figure 9:
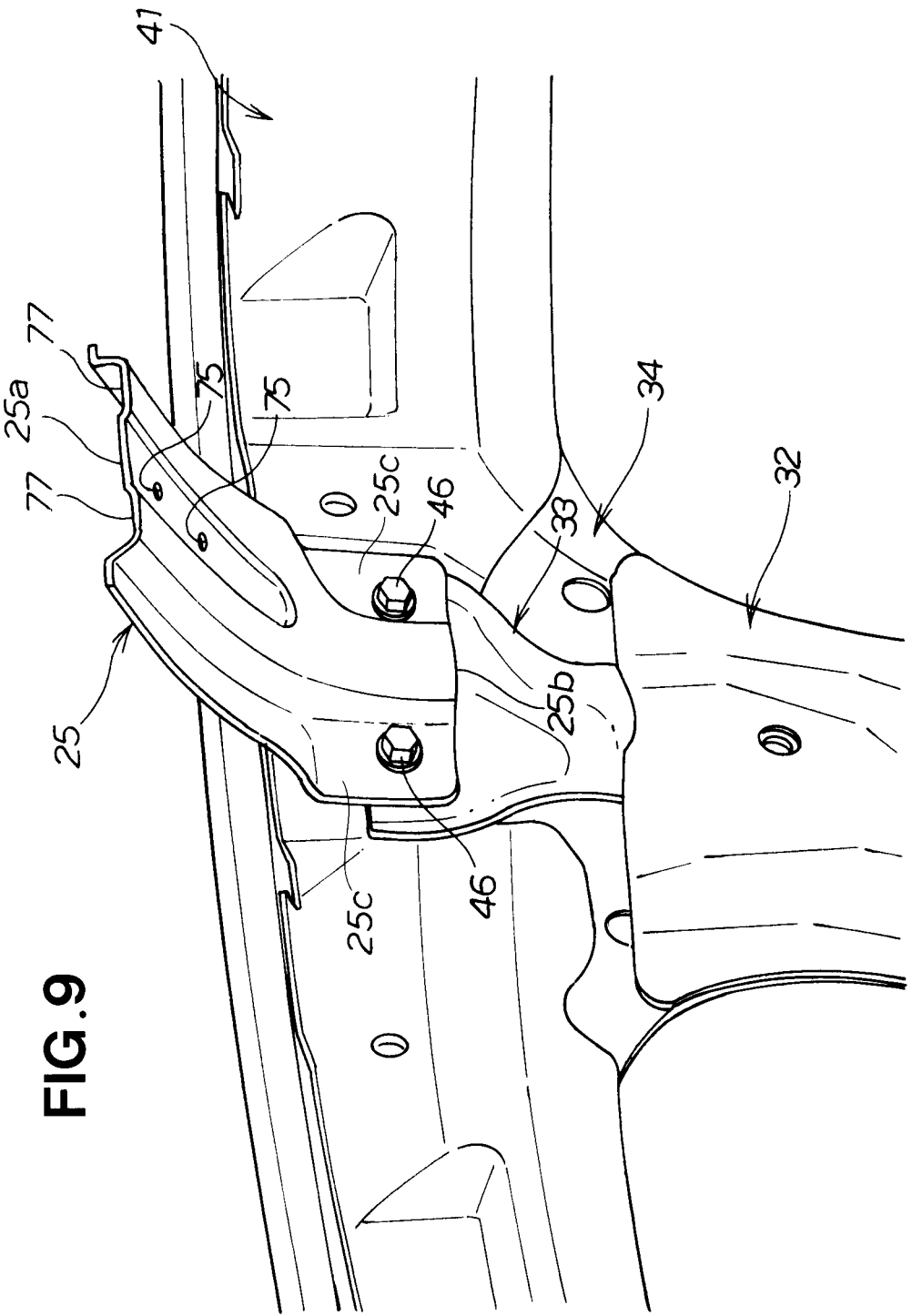
FIG. 9 is a perspective view illustrating showing a state of attachment of the corner gusset and the center pillar reinforcing member but with the roof side rail removed.

As shown in FIGS. 3, 6, and 9, the corner gusset 25 has first through-holes 75, 75 (FIG. 9) for accommodating the bolts 61, 61 for fastening the gusset to the roof arch 23 on the one end 25a, second through-holes 76, 76 (FIG. 3) for accommodating the bolts 46, 46 for fastening the gusset to the center pillar reinforcing member 33 via the roof side rail 22 on the other end 25b, and rigidity-enhancing beads 77, 77 formed in the longitudinal direction (vehicle widthwise direction). The corner gusset 25 is a plate curved outward and upward toward the passenger compartment.

The corner gusset 25 is integrally welded to the roof side rail 22 at a plurality of weld sites 78 (FIG. 6) in advance. The joining efficiency and attachment rigidity can thereby be improved. The bolts 61, 61 are fastened to the roof arch 23 through the first through-holes 75, 75. In addition, the bolts 46, 46 are fastened to the center pillar reinforcing member 33 through the second through-holes 76, 76, further improving the attachment rigidity.

In the vehicle body upper part structure 20, the strength of the center pillar 21 at the base part 21a and the main body part 21b can be improved by fastening the center pillar reinforcing member 33 and the corner gusset 25 with the roof side rail 22 interposed therebetween, as shown in FIG. 4. In other words, the upper end of the center pillar reinforcing member 33 is joined to the roof side rail 22, whereby the side impact load is transmitted directly to the roof side rail 22. Breaking of the center pillar 21 at the base part 21a and the main body part 21b is therefore prevented.

The outside panel 28 has a center pillar part 81 for covering the center pillar stiffener 34, the center pillar reinforcing member 33, and the center pillar inner member 32 from the outside of the passenger compartment; a roof side rail part 82 for covering the roof side rail 22 and the roof side stiffener 41 from the outside of the passenger compartment; a front pillar part 83 for covering the front pillar 19 (FIG. 2) from the outside of the passenger compartment; a rear pillar part 84 for covering the rear pillar 26 (FIG. 2) from the outside of the passenger compartment; and a side sill part 85 for covering the side sill 27 (FIG. 2) from the outside of the passenger compartment, as shown in FIGS. 1 and 4. The center pillar part 81, the roof side rail part 82, the front pillar part 83, the rear pillar part 84, and the side sill part 85 are integrally formed.

The roof side rail part 82 includes a slanted part 91 for covering the roof side rail 22, a lower extension 92 extending toward the passenger compartment 12 below the slanted part 91, an upper extension 93 extending downward above the slanted part 91, and a rail flange part 94 extending inward from the upper extension 93 in the vehicle widthwise direction.

The upper extension 93 and the rail flange part 94 constitute part of the groove (Mohican groove) 31 together with the bent part 72 and the end flange 73 of the roof panel 24.

Specifically, the bottom surface of the groove 31 in the portion containing the center pillar 21 is constructed of the roof panel 24 (end flange 73), the roof arch 23 (tongue piece 59), the outside panel 28 (roof flange part 94), the roof side stiffener 41 (upper flange 44), and the roof side rail 22 (upper flange 42). The outside wall of the groove 31 is constructed of the outside panel 28 (upper extension 93). In addition, the inner wall of the groove 31 is constructed of the roof panel 24 (bent part 72).

Figure 10:
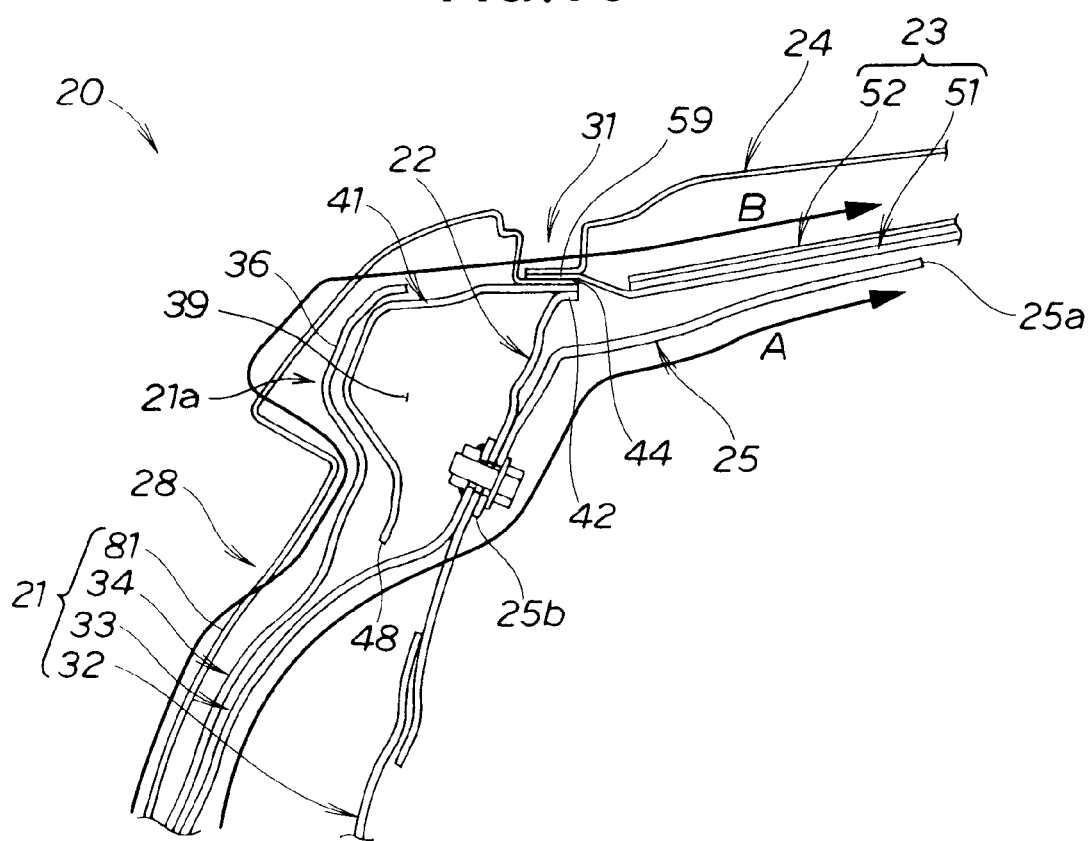
FIG. 10 is a view illustrating a load transmission path in the vehicle body upper part structure of FIG. 4.

The upper end of the center pillar reinforcing member 33 is passed through the opening 48 in the roof side stiffener 41, the one end 25a of the corner gusset 25 is linked to the roof arch 23, and the other end 25b of the corner gusset 25 is linked to the upper end of the center pillar reinforcing member 33 via the roof side rail 22 to form a load transmission path A toward the corner gusset 25, as shown in FIG. 10.

In addition, the center pillar stiffener 34 and the roof side stiffener 41 are provided to the outside of the center pillar reinforcing member 33, steps 42a, 44a (FIG. 3) for mounting the tongue piece 59 of the roof arch 23 are provided to a portion in which the roof arch 23 and the upper flanges 42, 44 of the roof side rail 22 and the roof side stiffener 41 are welded and fixed to each other, and the upper-end joint 36 of the center pillar stiffener 34 is expanded in the lengthwise direction of the vehicle body and superposed on the roof side stiffener 41 to form a load transmission path B, as shown in FIGS. 5 and 10. A collapse of the cross-section in the direction of the load transmission path B is thus prevented by expanding the upper-end joint 36 in the lengthwise direction of the vehicle body without using, for example, a bulkhead (partition) or the like.

In the vehicle body upper part structure 20, the center pillar stiffener 34 and the roof side stiffener 41 are provided to the outside of the center pillar reinforcing member 33, and the steps 42a, 44a for mounting the tongue piece 59 of the roof arch 23 are provided to a portion in which the roof arch 23 is welded and fixed to the upper flanges 42, 44 of the roof side rail 22 and the roof side stiffener 41 to improve the flexural rigidity of the roof side rail 22 and the roof side stiffener 41.

The load transmission path A and the load transmission path B complement each other. The plate thickness of the roof side stiffener 41 and the roof side rail 22 can be reduced in the load transmission path B due to the synergistic effect of the load transmission paths A, B. In addition, a roof side cross-section 39 can be made compact and the space in the passenger compartment can be expanded by reducing the load sharing in the roof side cross-section 39 constructed of the roof side stiffener 41 and the roof side rail 22. A small corner gusset 25 can be used in the load transmission path A, causing a reduction in vehicle body weight.

The vehicle body upper part structure 20 has a groove 31 formed between the outside panel 28 and the roof panel 24, as shown in FIG. 4.

In the vehicle body upper part structure 20, the upper end of the center pillar stiffener 34 is made to overlap with the roof side stiffener 41, the roof side stiffener 41 is joined to the roof arch 23 by the groove 31, and the upper end of the center pillar reinforcing member 33 on the inside of the center pillar stiffener 34 is joined below the groove 31 to the other end 25b of the corner gusset 25 in which the one end 25a is connected to the roof arch 23. The side impact load on the center pillar 21 can therefore be divided into two paths: a path (load transmission path B) running from the center pillar stiffener 34 toward the roof arch 23 via the roof side stiffener 41, and a path (load transmission path A) running from the center pillar reinforcing member 33 toward the roof arch 23 via the corner gusset 25.

Accordingly, the roof side cross-section 39 can be made compact and the space in the passenger compartment can be expanded by reducing the load sharing in the roof side cross-section 39, of which the roof side stiffener 41 is a constituent element. In addition, dividing the side impact load on the center pillar 21 into two paths allows the cross-section to be minimized at the base part 21a of the upper part of the center pillar 21, the plate thickness of the portion containing the center pillar 21 to be optimized, and a collapse of the cross-section at the base part 21a of the center pillar 21 to be suppressed.

As described above, the vehicle body upper part structure 20 is provided with the center pillar 21 extending in the height direction of the vehicle body, the roof side rail 22 linked to the upper end of the center pillar 21 and extended in the lengthwise direction of the vehicle body, the roof arch 23 extending in the vehicle widthwise direction from the roof side rail 22 at the position of the center pillar 21, the roof panel 24 extending in the vehicle widthwise direction from the roof side rail 22 above the roof arch 23, and the corner gusset 25 for reinforcing the space between the roof arch 23 and the roof side rail 22. The center pillar 21 is provided with the center pillar inner member 32 in which the upper end is joined to the roof side rail 22, and the center pillar reinforcing member 33 provided toward the outside in the vehicle widthwise direction and away from the center pillar inner member 32. A frame having a hollow cross-section is formed by the roof side rail 22 and the roof side stiffener 41. The roof side stiffener 41 has the opening 48 for accommodating the upper end of the center pillar reinforcing member 33. The one end 25a of the corner gusset 25 is linked to the roof arch 23, and the other end 25b of the corner gusset 25 is linked to the roof side rail 22 and the center pillar reinforcing member 33.

Specifically, the upper end of the center pillar reinforcing member 33 is passed through the opening 48 in the roof side stiffener 41, the one end 25a of the corner gusset 25 is linked to the roof arch 23, and the other end 25b of the corner gusset 25 is linked to the roof side rail 22 and the center pillar reinforcing member 33, as shown in FIG. 10, allowing the load transmission path A from the center pillar 21 toward the roof side rail 22 to be strengthened. A collapse of the cross-section at the base part 21a of the center pillar 21 can thereby be suppressed. In addition, the roof side cross-section 39 can be made compact and the space in the passenger compartment can be expanded by reducing the load sharing in the roof side cross-section 39, of which the roof side stiffener 41 is a constituent element.

In the vehicle body upper part structure 20, the roof arch body 51 of the roof arch 23 has the concave bottom part 54 extending in the vehicle widthwise direction, and the roof arch upper 52 having a cross-sectional hat shape opening downward toward the bottom part 54 is provided to form a closed cross-section that is continuous in the vehicle widthwise direction, as shown in FIG. 7. The roof side stiffener 41 can therefore be made stronger at the continuous closed cross-section even without the strengthening of the joint between the roof arch 23 and the roof side stiffener 41 at the groove 31, as shown in FIG. 4. As a result, the weight of the vehicle body 11 (FIG. 1) can be reduced. The corner gusset 25 has a projection 79 formed between the left and right beads 77, 77 on the upper part. The corner gusset 25 is joined to the roof arch 23 by the projection 79 in the portion containing the closed cross-section. In addition, the corner gusset 25 has left and right flat parts 25c, 25c on which the left and right beads 77, 77 are formed merging together into one bead on the lower part, as shown in FIG. 9. The corner gusset 25 is joined to the upper end of the center pillar reinforcing member 33 by joining the flat parts 25c, 25c to the upper end of the center pillar reinforcing member 33.

The corner gusset 25 does not protrude into the passenger compartment because the gusset has beads 77, 77 formed in the vehicle widthwise direction and is a curved plate, as shown in FIG. 6. As a result, the passenger compartment 12 (FIG. 1) can be expanded.

The corner gusset 25 is fixed along a roof side rail 22 constructed of a pair of L-shaped members or along a roof side rail 22 constructed of a single U-shaped member, allowing the roof side rail 22 to be supported over a wide area. The rigidity of the vehicle body can thereby be improved.

In the vehicle body upper part structure according to the present invention, the roof side rail 22 is comprised of a pair of L-shaped members extending in the lengthwise direction of the vehicle body, as shown in FIG. 4, but the rail is not limited to this structure alone and may be comprised of a single U-shaped member.

An example is given in which the corner gusset 25 has the beads 77, 77 formed in the longitudinal direction, as shown in FIG. 6, but the gusset is not limited to this structure alone and may be provided with a difference in grade or a flange in the longitudinal direction.

An example is given in which the steps 42a, 44a for mounting the tongue piece 59 of the roof arch 23 are provided, as shown in FIGS. 5 and 6, but this option is nonlimiting, and the steps 42a, 44a may be beads. In addition, steps and beads may be used together.

INDUSTRIAL APPLICABILITY

The vehicle body upper part structure according to the present invention can be used in a sedan, wagon, or other passenger vehicle.

LIST OF REFERENCE NUMERALS

10 Vehicle
20 Vehicle body upper part structure
22 Roof side rail
23 Roof arch
24 Roof panel
25 Corner gusset
25a One end
25b Other end
28 Outside panel
31 Groove
33 Center pillar reinforcing member
34 Center pillar stiffener
41 Roof side stiffener
54 Bottom part
77 Bead

The invention claimed is:

1. An vehicle body upper part structure having a groove defined to extend between an outside panel and a roof panel in a lengthwise direction of a vehicle body, comprising:
   a center pillar stiffener covered by the outside panel and extending in a vertical direction of the vehicle body;
   a roof side stiffener extending in the lengthwise direction of the vehicle body and overlapped by an upper end of the center pillar stiffener;
   a roof arch to which the roof side stiffener is joined at the groove, wherein the roof arch comprises: a roof arch body having a bottom part and an upwardly opening, hat-shaped cross-section; and a reinforcing member having a hat-shaped cross-section opening downwardly toward the bottom part, and the roof arch body and the reinforcing member jointly define a closed cross-section that is continuous in a direction of width of the vehicle body;
   a center pillar reinforcing member disposed closer to a lateral center of the vehicle body than the center pillar stiffener; and
   a corner gusset having one end connected to the roof arch and an opposite end joined to an upper end of the center pillar reinforcing member below the groove, with a roof side rail interposed therebetween, wherein the roof side stiffener has an opening formed to allow an upper end of the center pillar reinforcing member to pass therethrough and come into contact with the roof side rail, wherein the center pillar reinforcing member has a lower end joined to the center pillar stiffener, and the upper end of the center pillar reinforcing member extends through the opening from the outside to the inside in a vehicle width direction and is fastened by bolts to the roof side rail together with the opposite end of the corner gusset, wherein the corner gusset comprises a curved sheet having beads formed along a width of the vehicle body and the corner gusset has a projection formed between left and right beads at an upper part thereof, and the projection is joined to the roof arch at the closed cross-section, and wherein the left and right beads merge together into one bead at a lower part of the corner gusset to form right and left flat parts at the lower part, and the flat parts are joined to an upper end of the center pillar reinforcing member.

2. The vehicle body upper part structure of claim 1, wherein the corner gusset is fixed along the roof side rail comprised of one of a pair of L-shaped members and a single U-shaped member.

3. The vehicle body upper part structure of claim 1, wherein the center pillar stiffener has an upper-end joint formed at an upper end thereof so as to extend along an upper surface and a side surface of the roof side stiffener, and the upper-end joint has a width in the lengthwise direction of the vehicle body, which is greater than a width of the roof arch in the lengthwise direction of the vehicle body.

4. The vehicle body upper part structure of claim 1, wherein the roof arch body has a tongue piece coupled to the roof side stiffener unitarily with a bottom wall of the groove.

5. The vehicle body upper part structure of claim 1, wherein the roof side stiffener has a lower flange and the opening is formed by cutting out a part of the lower flange.

* * * * *